United States Patent [19]

Earnest

[11] 4,178,754

[45] Dec. 18, 1979

[54] THROTTLEABLE TURBINE ENGINE

[75] Inventor: Ernest R. Earnest, Hobe Sound, Fla.

[73] Assignee: The Hydragon Corporation, Lake Park, Fla.

[21] Appl. No.: 815,251

[22] Filed: Jul. 13, 1977

Related U.S. Application Data

[63] Continuation-in-part of Ser. No. 706,810, Jul. 19, 1976, abandoned.

[51] Int. Cl.² .............................. F02C 9/04; F02C 9/14
[52] U.S. Cl. ................................ 60/39.03; 60/39.18 R; 60/39.27
[58] Field of Search ................... 60/39.18 R, 39.18 B, 60/39.27, 39.29

[56] References Cited

U.S. PATENT DOCUMENTS

| | | |
|---|---|---|
| 2,360,969 | 10/1944 | Newcombe . |
| 2,955,422 | 10/1960 | Peterson .......................... 60/39.18 B |
| 3,103,785 | 9/1963 | Williams et al. .................... 60/39.27 |
| 3,148,503 | 9/1964 | MacPhail et al. . |
| 3,194,015 | 7/1965 | Pacault . |
| 3,303,646 | 2/1967 | Southam . |
| 3,436,912 | 4/1969 | Squires . |
| 3,500,636 | 3/1970 | Craig . |
| 3,516,248 | 6/1970 | McEwen . |
| 3,541,790 | 11/1970 | Kellett . |
| 3,611,718 | 10/1971 | Nebgen . |
| 3,783,614 | 1/1974 | Walker . |
| 3,785,145 | 1/1974 | Amann . |
| 3,791,137 | 2/1974 | Jubb et al. . |
| 3,796,045 | 3/1974 | Foster-Pegg . |
| 3,802,185 | 4/1974 | Tallock . |
| 3,802,186 | 4/1974 | Mahler . |
| 3,830,062 | 8/1974 | Morgan et al. . |
| 3,899,886 | 8/1975 | Swick ................................. 60/39.29 |
| 3,975,900 | 8/1976 | Pfefferle ............................ 60/39.27 |

FOREIGN PATENT DOCUMENTS

| | | | |
|---|---|---|---|
| 1006102 | 4/1952 | France ................................. 60/39.27 |
| 331763 | 9/1929 | United Kingdom ................ 60/39.18 B |
| 605088 | 7/1948 | United Kingdom . |

*Primary Examiner*—Robert E. Garrett
*Attorney, Agent, or Firm*—Harness, Dickey & Pierce

[57] ABSTRACT

A method and apparatus for control of an integrated combined cycle Brayton-Rankine engine is disclosed. The engine has a combustor and main power turbine operating on the Brayton cycle. Combustion air is supplied by a compressor independently driven by a Rankine vapor turbine. The closed loop Rankine cycle derives its heat energy from the exhaust of the Brayton turbine. Engine speed and power level are controlled by varying the fuel flow to the combustor and by throttling the air flow to the compressor.

18 Claims, 8 Drawing Figures

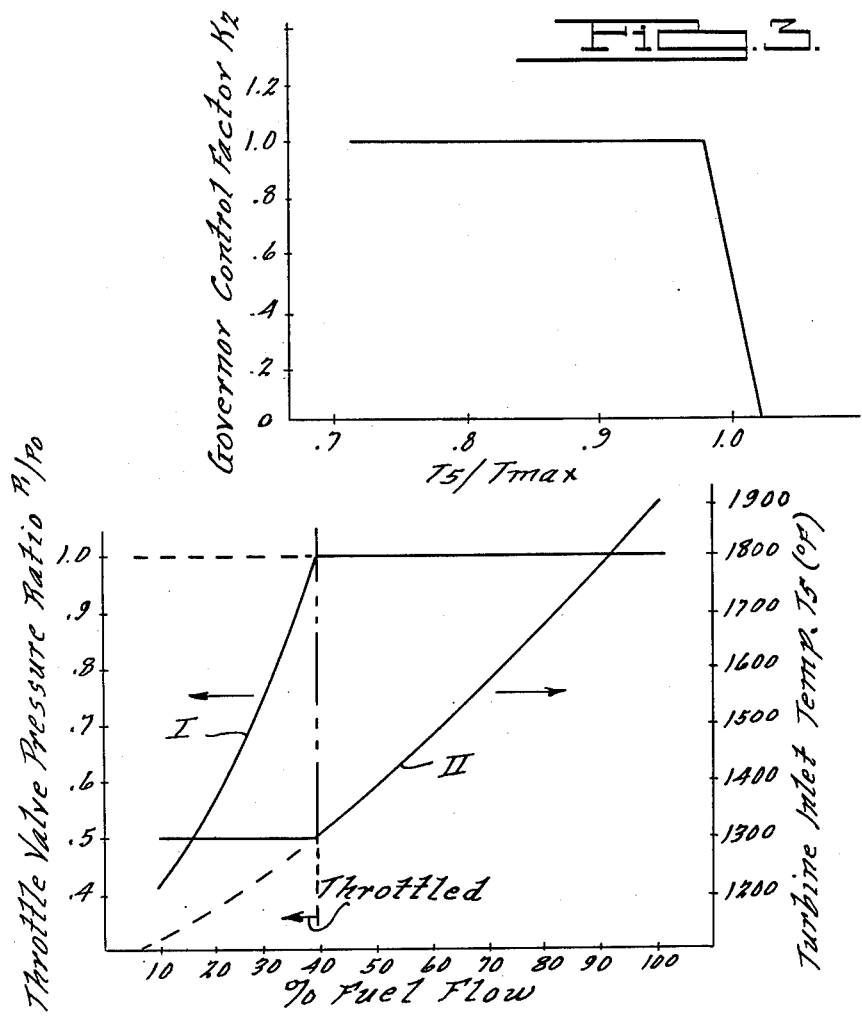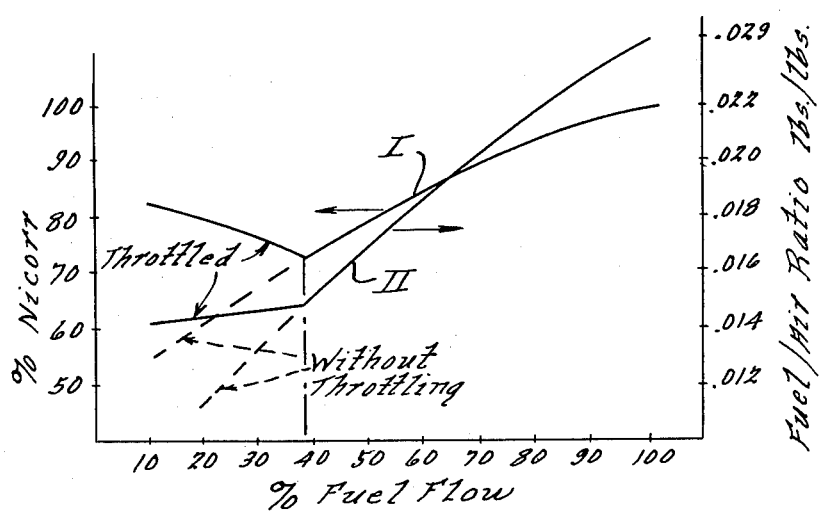

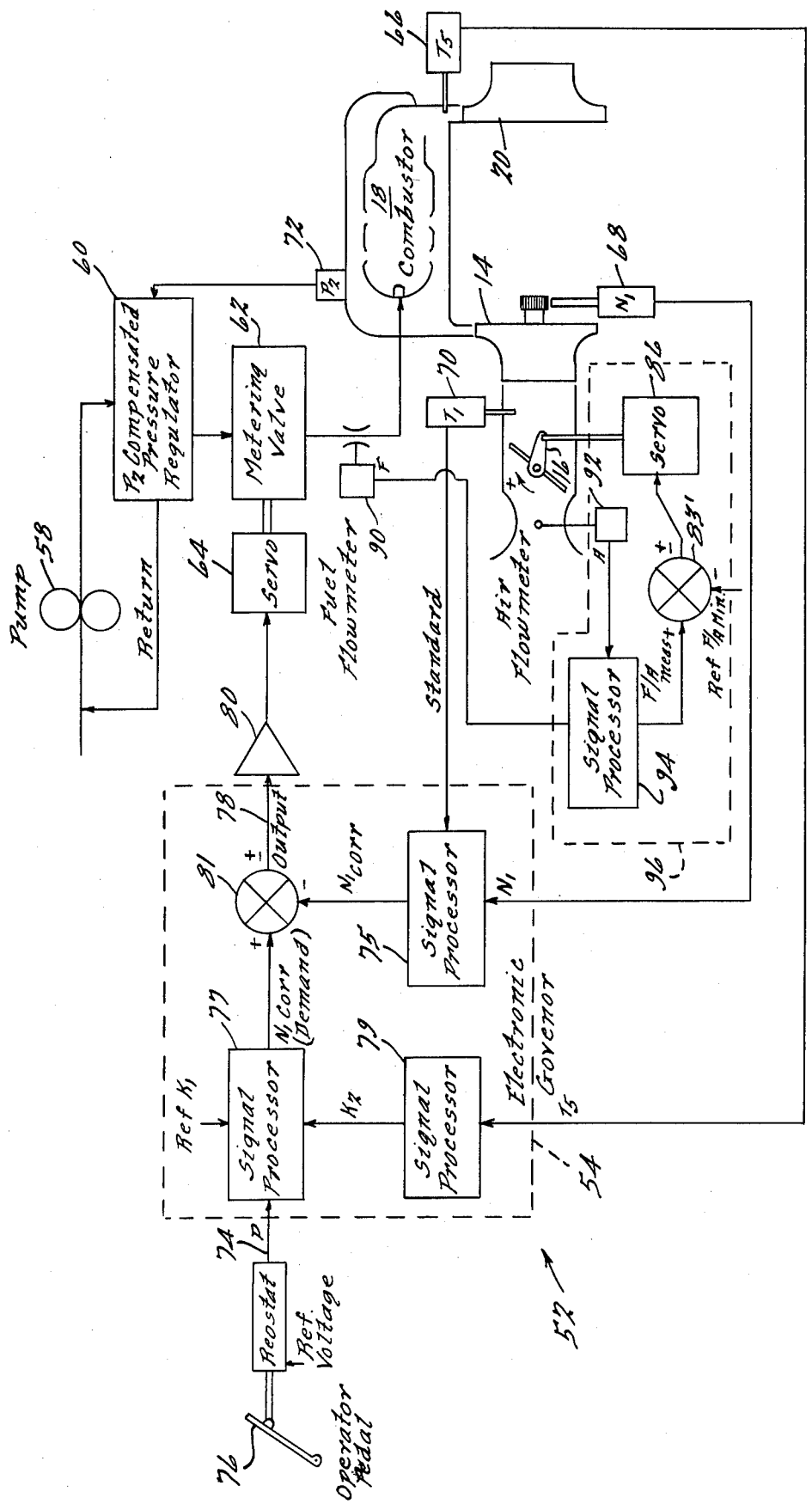

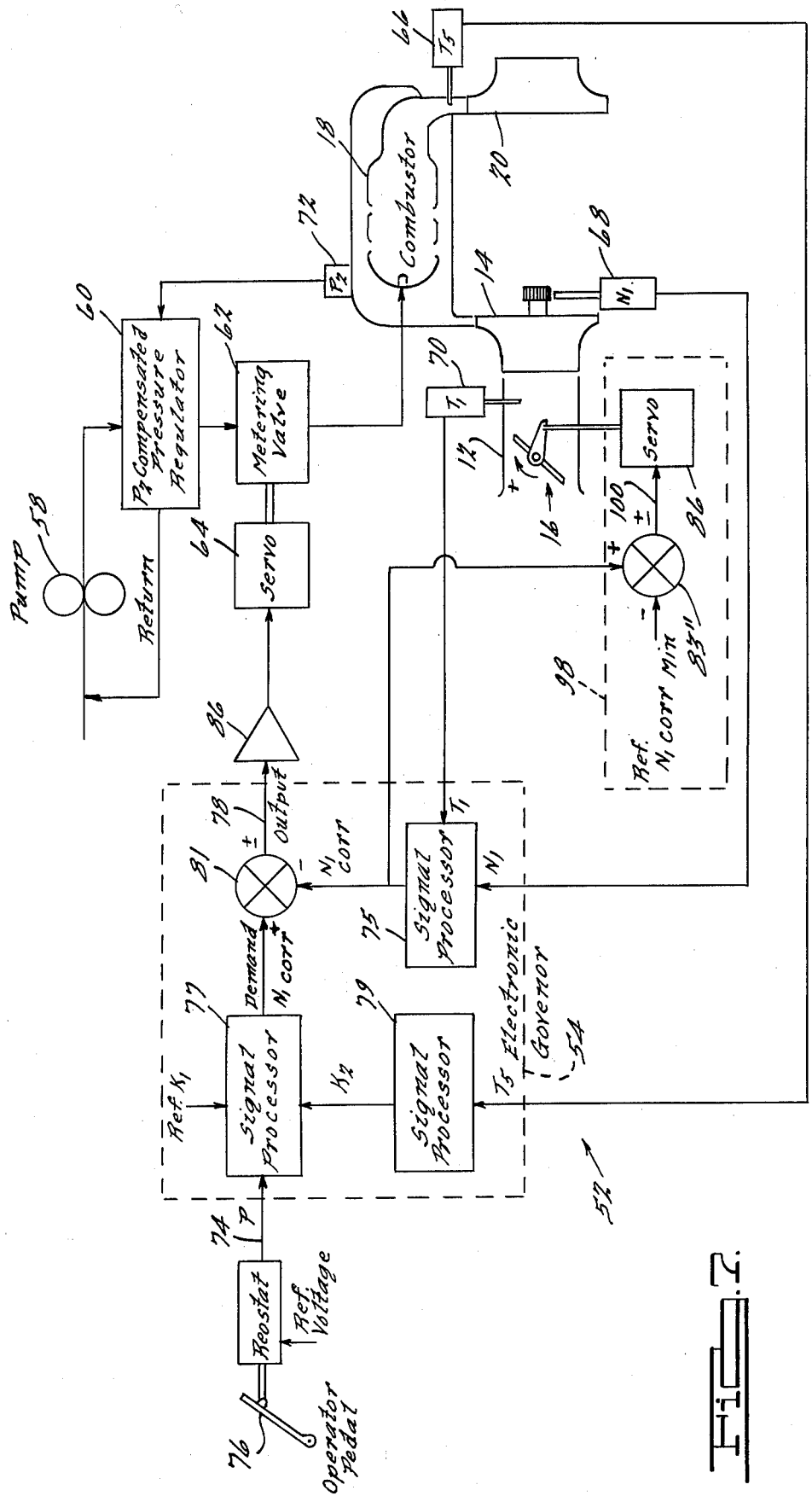

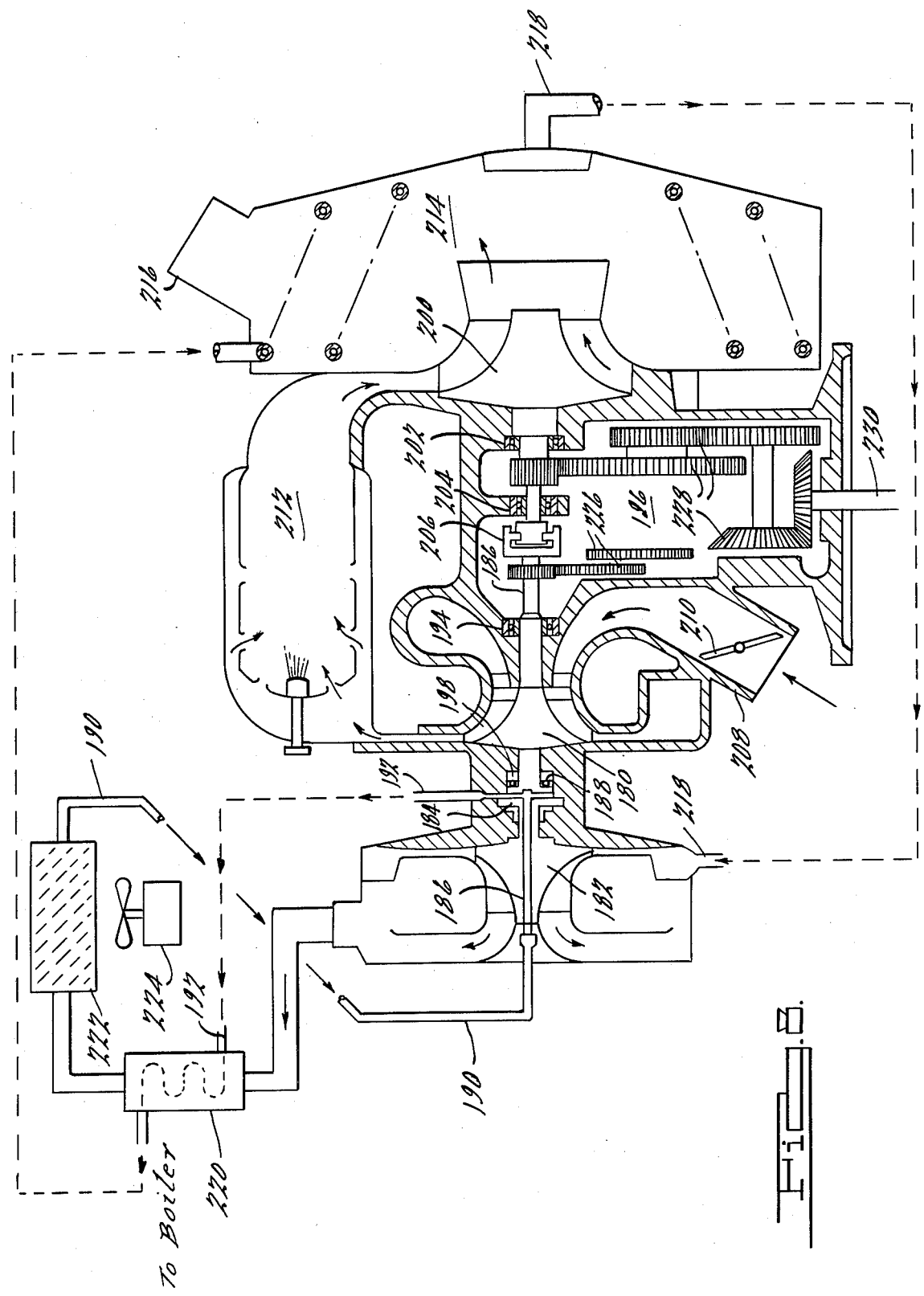

THROTTLEABLE TURBINE ENGINE

BACKGROUND—SUMMARY OF THE INVENTION

This application is a continuation in part of application Ser. No. 706,810 filed July 19, 1976, now abandoned.

The present invention relates to gas turbine engines of the integrated combined cycle Brayton-Rankine type and more particularly to a unique and improved control system therefor.

Gas turbine engines are being proposed and developed today for an ever widening variety of applications, including automotive and other wheeled vehicle propulsion. For many of these applications it is necessary for the engine to operate over a wide range of power levels and to respond rapidly to operator demands for changes in power level. Two of the disadvantages of typical gas turbines when applied to these applications are slow acceleration response from idle or low power level and high fuel consumption at idle. The slow response is caused by compressor lag; that is, the time required to accelerate the compressor. In attempts to overcome compressor lag, some gas turbines utilize very high idle speeds and variable flow path geometry components, such as compressor preswirl vanes. These solutions, however, also have shortcomings, such as high fuel flow at idle and control system complexity.

It has been proposed to use integrated combined cycle Brayton-Rankine gas turbine engines. Such engines are disclosed in the inventor's copending applications, Ser. No. 439,149, filed Feb. 4, 1974, now abandoned, and Ser. No. 532,747, filed Dec. 16, 1974, which issued on Jan. 10, 1978 as U.S. Pat. No. 4,067,189. In these applications a main power turbine operating on the Brayton cycle receives its air supply from a compressor which is direct-driven by a second turbine which forms the power output component of a Rankine cycle system. The Rankine system receives its heat energy from the exhaust of the main power turbine.

The present invention has as its overall object to improve gas turbine engines, particularly of the integrated combined cycle Brayton-Rankine type. Another object is to provide an improved Brayton cycle-Rankine cycle combined engine which overcomes the typical gas turbine shortcomings of slow acceleration response and high fuel consumption at idle. A further object is to provide a unique control system for such an engine which solves these problems.

Still further objects and advantages of the invention will become apparent upon consideration of the present disclosure and the accompanying drawings.

BRIEF DESCRIPTION OF THE DRAWINGS

FIG. 3 is a plot of the proposed overtemperature control parameter versus the turbine inlet temperature ratio;

FIG. 4 shows the turbine inlet temperature schedule for the throttling control and the resulting throttled pressure ratio;

FIG. 5 shows the effect of inlet throttling on gas generator corrected speed;

FIG. 6 illustrates a second embodiment of the control system;

FIG. 7 illustrates a third embodiment of the control system; and

FIG. 8 is another embodiment of the engine.

DESCRIPTION OF THE PREFERRED EMBODIMENTS

Figure 1:
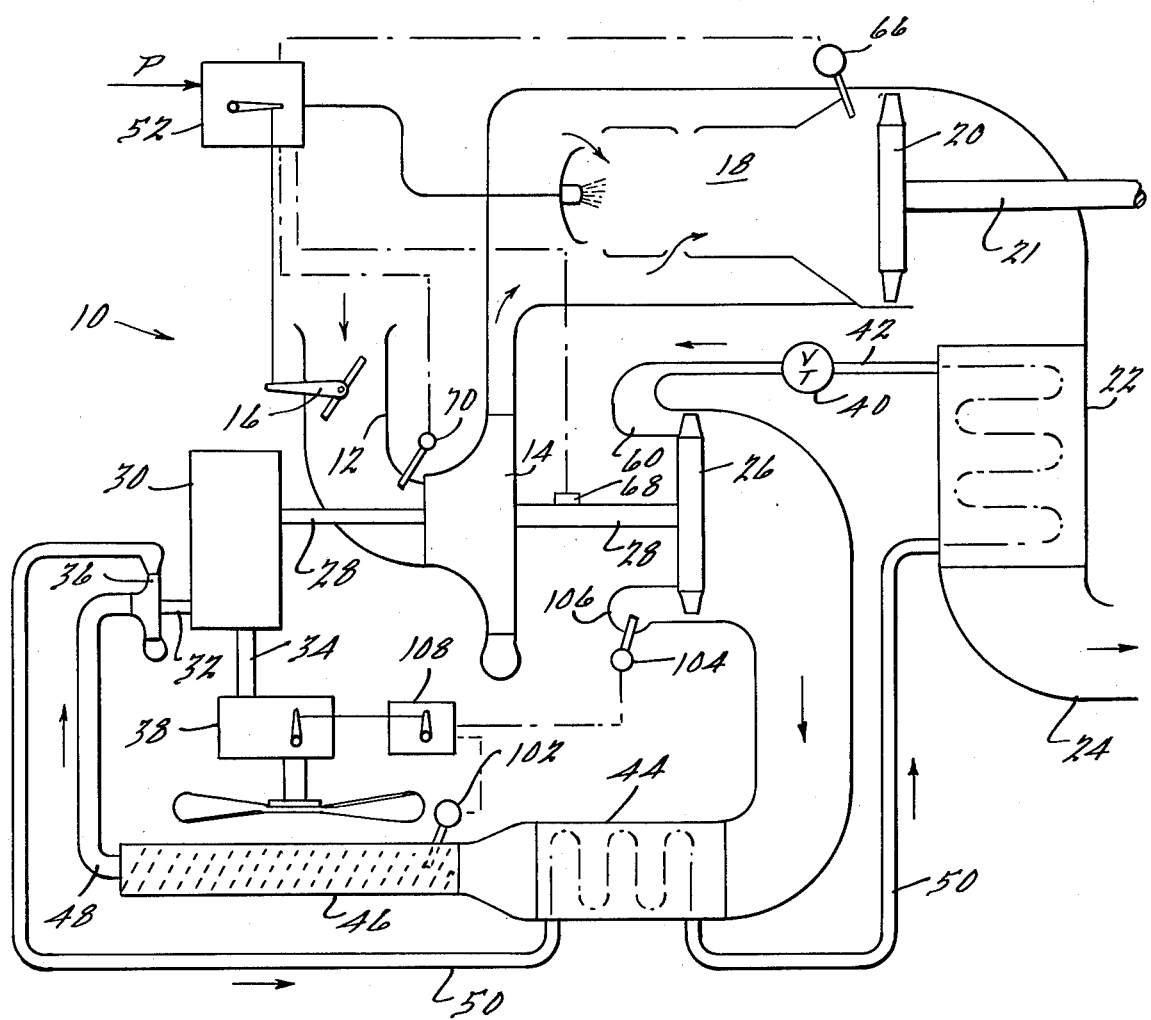
FIG. 1 is a schematic diagram of a Brayton cycle-Rankine cycle engine in accordance with the present invention.

The basic components of the engine and control system are shown in FIG. 1, the engine being designated generally by the numeral 10. Air enters the engine 10 through the inlet duct 12 and is raised to a pressure of several atmospheres by the compressor 14. A throttle valve 16 is positioned in the inlet duct 12 and controls the flow of air to the compressor 14 in a manner to be described below.

From the compressor, the high pressure air enters the combustion chamber 18 where fuel is added and ignited to raise the temperature of the air. The combustion products are expanded through the main power turbine 20 which is coupled to the load (not shown) via power output shaft 21. Heat from the turbine exhaust gases is used to power the heat exchanger (boiler) 22 of a closed-loop Rankine cycle using an organic working fluid. Air passing through the boiler 22 is exhausted from the engine through outlet duct 24. The fluid in the Rankine system, which preferably is toluene, pyridine, or a similar organic fluid, is vaporized in the boiler and is used to drive a Rankine turbine 26. The Rankine turbine 26 and the compressor 14 of the open-loop Brayton cycle have their rotors on a common shaft 28 and the work produced by the Rankine turbine 26 drives the compressor 14. The shaft 28 extends through and beyond the compressor 14 and its air inlet section 12 to drive gearing (not shown) in gearbox 30. The gearbox 30 has output shafts 32 and 34 for driving a liquid feed pump 36 and a variable speed cooling fan 38, respectively. The gearbox 30 also may be adapted to drive any other desired accessories.

The Rankine turbine 26 draws its vapor from the heat exchanger 22. The heat exchanger 22 is incorporated in the outlet (exhaust) duct 24 and preferably is constructed in accordance with U.S. Pat. No. 3,874,345, although it can be of any conventional configuration. In accordance with that patent, the intercycle heat exchanger 22 has an annular core consisting of parallel multiple path small diameter tubes of the same length arranged in concentric helical coils such that the fluid flow progresses from the outermost coil inward while the exhaust gases flow radially outward. A thermostatic throttle valve 40 is positioned in the duct 42 which flows the vaporized gas from the heat exchanger 22 to the turbine 26. The valve 40 operates in a manner which is described below.

From the turbine 26, the low pressure working medium is still in vapor form and passes through a counterflow regenerator 44 and into and through a condensor 46 where it is cooled and liquified. The cooling of the condenser 46 is assisted by the fan 38. From the condenser 46, the liquified Rankine fluid is delivered by conduit 48 to the feed pump 36 which in turn delivers the liquid to the heat exchanger 22 via conduit 50 and regenerator 44 for vaporization in the heat exchanger, as will be understood.

The power level of the combined engine 10 is controlled by varying the fuel flow to the combustion chamber 18 and by throttling the compressor inlet air via throttle valve 16. These factors are controlled and varied by a control mechanism 52.

The primary function of the control mechanism 52 is to modulate the engine power level by increasing and decreasing fuel flow in response to the operator's demand for more or less engine power. It is also necessary for the control 52 to maintain the exit temperature of the combustor 18 within specified limits. It is desirable to prevent the combustor exit temperature from falling too low, for example 1300° F., in order to maintain stable combustion and low exhaust emissions. It is also desirable to set the lower limit so that there will be adequate heat remaining in the turbine exhaust to drive the compressor 14, by means of the Rankine cycle, continuously at 50% or greater speed. It is also desirable to prevent excessive combustor exit temperature, for example above 1900° F., to prevent damage to the turbine.

Figure 2:
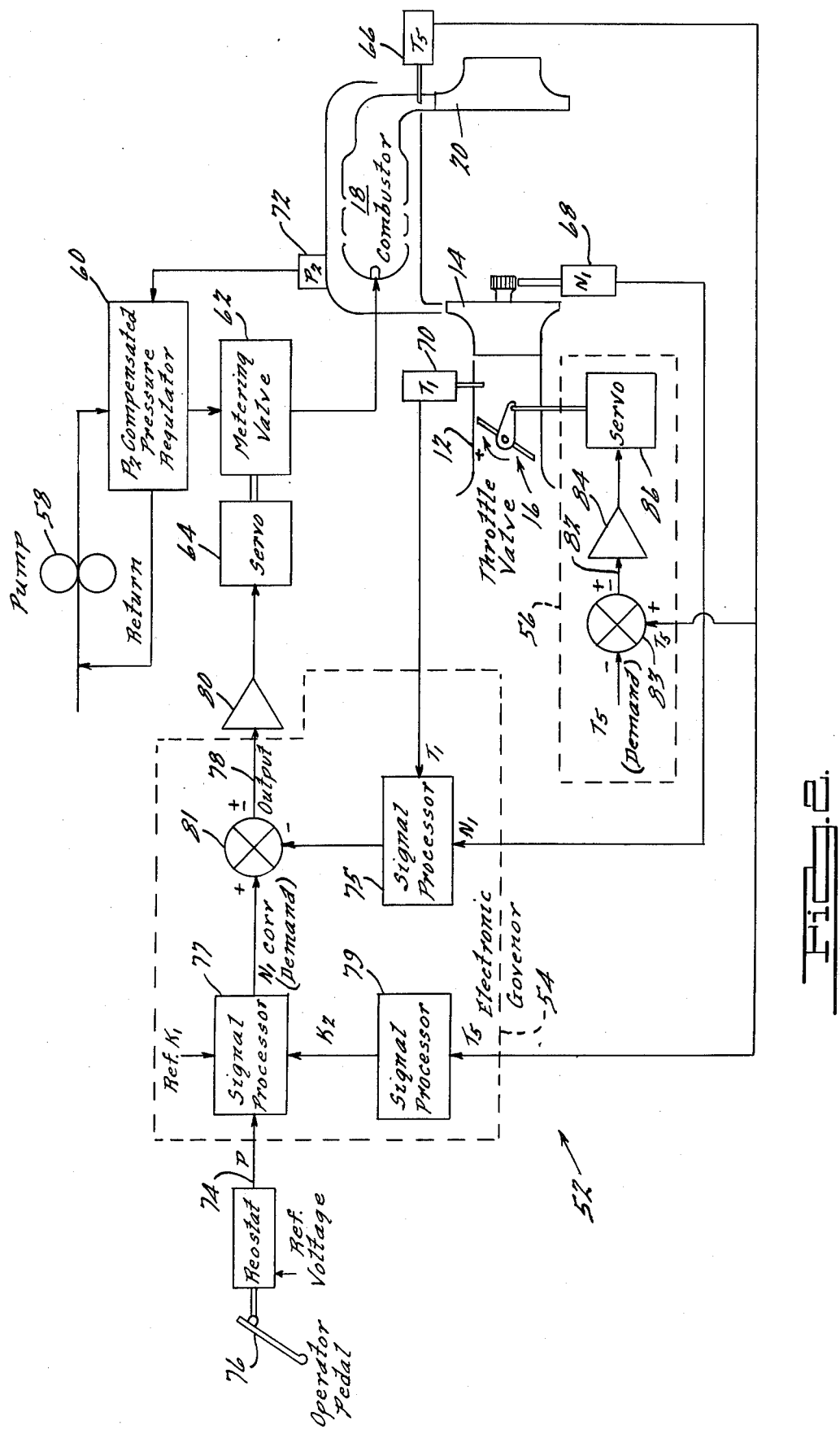
FIG. 2 is a schematic diagram of the control system including the fuel control and inlet throttling control.

The control mechanism 52, including the fuel control and air throttling control, is shown in block diagram in FIG. 2. There are two primary control loops within the control mechanism 52. A gas generator speed governor 54 modulates the fuel flow, and a combustor exit temperature control mechanism 56 modulates the position of the inlet throttle valve 16. Fuel is supplied to the control by a positive displacement pump 58. The pump 58 is shown to be a gear-type pump in FIG. 2, although any type of conventional fuel pump can be utilized. Fuel pressure is controlled by a pressure compensated pressure regulator 60 which bypasses excess flow. The regulator 60 is compensated to compressor discharge pressure ($P_2$). A fuel metering valve 62 is servo driven by servo motor 64 from the output of the speed governor 54.

The functions of the various control elements can be accomplished hydro-mechanically, pneumatically, or electronically, as is known in the art. For example, hydromechanical and electronic control systems for gas turbine aircraft engines are disclosed in the Society of Automotive Engineers article SAE 740380, dated Apr. 2-5, 1974, electronic fuel controls for gas turbine engines are disclosed in the Society of Automotive Engineers article SAE 751061, dated Nov. 17-20, 1975, and another type of fuel control system for a gas turbine engine is disclosed in the American Society of Mechanical Engineers article ASME 74-GT-142, dated 1974.

In the preferred embodiment of the invention the data processing components of the control are electronic. The various engine operating parameters are measured by sensors to supply the input information to the control 52. The input parameters include: gas generator rotor speed ($N_1$), combustor exit (turbine inlet) temperature ($T_5$), compressor inlet temperature ($T_1$), and compressor exit pressure ($P_2$). Sensor 66 measures $T_5$, sensor 68 measures $N_1$, sensor 70 measures $T_1$ and sensor 72 measures $P_2$. The operator input to the controller is a voltage signal 74 from a reostat sensing pedal 76 or power level position. The signal 74 is used as the basic control parameter for the $N_1$ speed control governor 54.

To compensate for variations in the inlet temperature $T_1$ of the compressor 14, the governed speed $N_1$ is corrected electronically in signal processor 75 in accordance with the following equation:

$$N_{1corr} = N_1 \sqrt{T_1}/T\text{standard}$$

where Tstandard is a predetermined temperature calculated to correct for changes in ambient temperature. Typically Tstandard is 59.6° F. Thus, the measured $N_1$ and $T_1$ signals are processed electronically to produce the $N_{1corr}$ parameter.

The $N_{1corr}$ (demand) parameter is computed electronically in signal processor 77 in accordance with the following equation:

$$N_{1corr}(demand) = PK_1 K_2$$

where P is the pedal position signal, $K_1$ is a calibration factor, and $K_2$ is an overtemperature protection factor. $K_1$ is calibrated such that for the maximum pedal travel $P_{max}$:

$$(P_{max})K_1 = 100\% \ N_{1corr}$$

$K_2$ is normally equal to unity except when the turbine inlet temperature approaches its prespecified maximum allowable value ($T_{max}$); in the last instance, $K_2$ is sharply reduced to modify the $N_{1corr}$ (demand) downwardly to cause a reduction in fuel flow. FIG. 3 shows a proposed control schedule for $K_2$ versus $T_5/T_{max}$. Signal $K_2$ is programmed electronically in signal processor 79 in accordance with the schedule depicted in FIG. 3.

The function of the governor 54 is to maintain the engine at a specific gas generator corrected speed. The output signal 78 from the control mechanism 54 is achieved by summing $N_{1corr}$ (demand) and $N_{1corr}$ algebraically at summing point 81:

$$N_{1corr}(demand) - N_{1corr} = output$$

The output signal 78 is then amplified, such as by amplifier 80, and used to operate the fuel metering valve 62 to open or close said valve at a rate proportional to the error signal.

The control mechanism 52 also contains a minimum $T_5$ control loop which establishes a lower limit on the combustor exit temperature of the combustor 18. As engine power is reduced, the fuel flow normally decreases more than airflow resulting in a lean fuel/air ratio and low combustion temperature. In the present invention, the operating range of the combustor is extended to lower fuel flows by throttling the combustion air upstream of the compressor at power levels below approximately 25%. The combustor exit temperature $T_5$ is used as the throttling control parameter. The algebraic difference between the measured value of $T_5$ and a programmed control reference minimum temperature $T_5$ (demand) is calculated at summing point 83 and is used as the ouput error signal 82. The signal 82 is calculated in accordance with the following:

$$T_5(demand) - T_5(measured) = output$$

The output signal 82 is magnified by amplifier 84 and drives a servo motor 86 which in turn modulates the inlet throttling valve 16. The rate of throttle modulation thus is a function of the magnitude of the error signal 82.

FIG. 4 shows the turbine inlet temperature ($T_5$) schedule for the throttling control and the resulting inlet throttled pressure ratio ($P_1/P_0$) for a typical engine operation in which a control $T_5$ minimum reference value of 1300° F. is utilized. $P_1$ is the pressure of the inlet air entering the compressor 14, $P_0$ is the ambient pressure, and both $T_5$ and $P_1/P_0$ are shown in terms of the percent of fuel flow into the combustor 18. Line I charts $P_1/P_0$ versus percent fuel flow while line II charts $T_5$ versus percent fuel flow. At 10% fuel flow a 58% throttling pressure drop is required to maintain 1300° $T_5$ while above approximately 38%–40% fuel flow inlet throttling is not required. The dashed lines below 38%–40% fuel flow show what the effect would be in the engine if the compressor inlet air were not throttled.

One advantage of inlet throttling of the integrated Brayton-Rankine cycle engine is a high gas generator idle speed. The dynamic response of any free turbine engine is a function of the gas generator rotor inertia and the idle speed. Throttling the inlet of a conventional Brayton Cycle free turbine engine will cause the gas generator rotor speed to drop because of the loss of pressure ratio across the gas generator turbine. However, in the engine proposed by the present invention, the power to drive the compressor is derived from Brayton exhaust heat energy rather than pressure. When the inlet is throttled, the gas generator speed actually increases because compressor work is decreased at a greater rate thabn that of exhaust heat energy. The influence of inlet throttling on gas generator speed ($N_1$) and fuel/air ratio (F/A) is shown in FIG. 5 for an engine operating on the control schedule shown in FIG. 3. Line I in FIG. 5 charts percent $N_{1corr}$ versus percent fuel flow while Line II charts F/A versus percent fuel flow. The dashed lines below 38%–40% fuel flow show the speed curves without inlet throttling.

Another embodiment of the control mechanism 52 in accordance with the present invention is shown in FIG. 6. The control 52 is the same as that shown in FIG. 2, except that the throttle valve control parameter is the fuel/air ratio. Mass flow meters 90 and 92 are positioned, respectively, in the fuel supply line to measure fuel flow and in the inlet air ducting to measure air flow. The data signals from the mass flow meters 90 and 92 are fed into a signal processor 94 in the throttle valve mechanism 96. A prespecified minimum allowable fuel/air ratio (F/A$_{min}$) is also programmed into the mechanism 96. The input signals from the flow meters 90 and 92 are used to compute a measured fuel/air ratio (F/A$_{meas}$). The algebraic difference between the F/A measure ratio and the F/A minimum (demand) ratio is secured at summing point 83' and is used as an output in the form of an error signal to drive the servo motor 86. The motor 86 in turn controls the movement of the throttle valve 16.

Still another embodiment of the present invention is shown in FIG. 7. In this case, the control system 52 is identical to that shown in FIG. 2 except that the $N_{1corr}$ signal is used as the control parameter for the throttle valve 16. A prespecified minimum allowable rotor speed ($N_{1corr-min}$) is programed into control mechanism 98. The algebraic difference between the $N_{1corr}$ based on measured values of $N_1$ and $T_1$, and the minimum (demand) $N_{1corr}$ is calculated at summing point 83" and is used as an output in the form of an error signal 100 to drive the servo motor 86 as described above with reference to FIGS. 2 and 6.

By referring to FIGS. 4 and 5 it may be seen that the turbine inlet temperature $T_5$, the fuel/air ratio F/A, and the gas generator speed $N_1$ are interrelated and influenced by the inlet throttling. The throttling may be controlled by any of these interrelated parameters with similar results and advantages in engine performance.

In one embodiment, the engine power level can be controlled by varying the inlet temperature of the power turbine 20 with the compressor inlet throttle 16 in the open position. When the minimum turbine inlet temperature has been reached, further power reductions are provided by throttling the inlet flow. As throttling occurs, the speed of the Rankine turbine 26 and the compressor 14 remains approximately 75% or greater of maximum speed, while engine mass flow and fuel flow decrease. The engine can be throttled at the inlet until the pressure ratio and work of the power turbine 20 are near zero. This is because the compressor 14 is being driven by work derived from exhaust heat only. The air and fuel flow are reduced simultaneously so that the fuel/air ratio remains approximately constant. Thus, combustion stability is maintained and the fuel flow at idle can be very low. Because the inlet temperature of the power turbine 20 remains high, the exhaust gas temperature also remains high. Fluid and metal temperatures in the boiler 22 likewise remain at a high level so that there is little thermal inertia to be overcome in the Rankine cycle in order to accelerate the engine. Approximately at power levels below 25%, the compressor inlet air is throttled by throttle 16 and the turbine 20 inlet temperature is held constant at 1300° F. The throttling to control power permits the compressor 14 rotating speed to remain high to assure acceleration capability. The speed of the compressor 14 varies between 75% and 100% of maximum engine speed and greater than 80% at idle.

The Rankine cycle of the engine 10 is controlled by the thermostatic throttle valve 40 at the inlet to the Rankine turbine 26. The Rankine cycle control system is independent of the control system 52 for the Brayton cycle and is fully automatic. It may be hydromechanical, electronic, or fluidic. The valve 40 controls fluid mass flow in order to maintain a constant turbine inlet temperature. For an organic working fluid such as toluene, the valve would maintain the peak Rankine cycle temperature at a constant 700° F. The turbine exit pressure varies with condensing temperature. The temperature of the condenser 46 is controlled by varying the speed of the condenser cooling fan 38 which is driven through a variable speed drive from the accessory gearbox 30. For this purpose, heat sensors 102 and 104 are positioned in the condenser 46 and the Rankine turbine inlet 106, respectively. The sensors 106 and 104 are connected to control mechanism 108 which acts in accordance with the input from the two sensors to modify the operation of the fan 38. The fan speed control varies the fan drive ratio to always maintain the condenser 46 pressure in a fixed ratio relative to the pressure in the turbine inlet 106. The Rankine turbine will thus operate at near constant efficiency at all times since the inlet temperature and pressure ratio are held constant and the compressor 14 speed range is narrow due to compressor inlet throttling.

Where pyridine is used as the Rankine cycle working fluid, the Rankine loop will preferably operate with a turbine inlet temperature of 700° F., a turbine inlet pressure of 500 psia, a condensor temperature of 163° F. and a condensor pressure of 3.56 psia. The counterflow regenerator 44 is used to improve efficiency.

The present invention provides an engine having a low level of exhaust emissions that will meet anticipated future standards, having configurational and control function simplicity to minimize manufacturing cost and to insure reliability, having power flexibility over a wide operating speed range to assure compatibility with existing transmissions, having a high rate of engine response including acceleration from idle, and having high efficiency over a wide power range including low fuel flow at idle.

To insure a low level of exhaust emissions, the engine 10 is designed with a low burner inlet air temperature, an adequate burner temperature rise at all cycle points, and a moderate range of fuel/air ratios. Nitrous oxide formation is primarily a function of peak combustion temperature which in turn is a direct function of the burner inlet temperature. The present engine 10 is adapted to run with a maximum burner inlet temperature on the order of 480° F., while typical regenerative gas turbines run with a maximum burner inlet temperature on the order of 1100° F.

To attain high combustion efficiency and low levels of carbon dioxide and hydrocarbons, a sufficiently rich overall fuel/air ratio and burner temperature rise is required to promote mixing and stability. The range of fuel/air ratios for the present engine 10 between steady state points is about 2 to 1, whereas 3 to 1 and 4 to 1 are typical for aircraft gas turbines. Adequate burner temperature rise and fuel/air ratio are maintained at low power and idle by throttling the inlet air.

Another embodiment of a Brayton cycle-Rankine cycle combined engine in accordance with the present invention is shown in FIG. 8. In this embodiment, all of the major rotating elements are located on a common axis. The gas generator comprises a compressor 180, Rankine turbine 182, and a fluid centrifugal feed pump 184 which is integral with shaft 186. A hydrodynamic journal and thrust bearing 188 is located near the center of gravity of the rotor and is lubricated by the Rankine working fluid.

A bearing 194 supports the shaft 186 at the end adjacent the compressor 180 and has a common lubrication system with the gearbox 196. A sliding seal face between the compressor 180 and Rankine turbine 182 is backed up by a static elastomer seal 198 which is seated whenever there is a negative pressure ratio from the bearing compartment. Except for the shaft seal 198, the Rankine loop is hermetically sealed. The only other rotating element of the Rankine loop is the boost pump (not shown) which is driven through a sealed magnetic coupling from the accessory drive gearbox 196.

The Brayton power turbine 200 is a single-stage radial inflow type and is cantilever mounted on one end of interconnecting shaft 186. The power turbine 200 is mounted on bearings 202 and 204 in the gearbox 196. An alternate configuration can use a double-exit power turbine to reduce bearing thrust load and provide an increase in turbine efficiency. An overrunning clutch 206 is provided on the shaft 186 between the power turbine 200 and compressor 180. The clutch 206 is positioned in the gearbox 196 and is arranged so that it will engage whenever the speed of the power turbine 200 matches or exceeds that of the compressor 180, but will disengage when the power turbine speed is reduced below that which the compressor will be driven by the Rankine turbine alone. The coupled turbine arrangement as shown in FIG. 8 permits the engine to be operated at a higher compressor pressure ratio in the coupled mode and thus increase engine efficiency. It also helps prevent overspeeds of the power turbine due to sudden changes in load.

In all other respects of arrangement and control, the engine construction is the same as engine 10 described above with reference to FIG. 1. Air enters inlet duct 208 and is throttled by throttle valve 210. The air then is compressed by compressor 180 and directed to burner 212 where it is raised to a high temperature. The heated and compressed gas then flows through power turbine 200 and into the heat exchanger (boiler) 214. The exhaust gas exits from the engine via outlet duct 216.

In the Rankine cycle, the heated working fluid travels from the boiler 214 through conduit 218 to the Rankine turbine 182. From the turbine 182, the fluid passes through the remainder of the Rankine closed-loop cycle before returning to the boiler 214. In particular, the working fluid exits from the turbine 200 as a low pressure vapor and travels through a regenerator (recuperator) 220 and a condensor 222 where it is returned to its liquid state. The liquid is then sent through the feed pump 184 (via conduits 190 and 192) and the regenerator 220, where it is returned to the boiler 214 as a preheated high pressure liquid. A variable speed drive fan 224 controls the temperature of the condensor 222.

The accessory drive and reduction gearbox 196 is common with a central lubrication system. The engine accessories which are needed at all times during the operation of the engine, such as the fuel pump, oil pump, condensor fan and boost pump are driven from the shaft 186 by accessory drive gears 226. The main reduction gears 228 and remaining accessories are driven by the power turbine 200. The main power output shaft 230 of the engine is driven in turn by the reduction gears 228.

In operation of the coupling engine shown in FIG. 8, the operational parameters and characteristics are slightly different than those described above with reference to FIGS. 1–7.

While it will be apparent that the preferred embodiments illustrated herein are well calculated to fulfill the objects above stated, it will be appreciated that the present invention is susceptible to modification, variation and change without departing from the scope of the invention, as defined by the following claims.

I claim:

1. An integrated Brayton cycle-Rankine cycle engine comprising a Rankine turbine and a rotary compressor driven thereby, a Brayton turbine and an intercycle heat exchanger heated by the exhaust of the Brayton turbine and delivering heat to the Rankine fluid for powering the Rankine turbine, a combustor and air supply assembly for delivering to the Brayton turbine air from the compressor together with products of combustion from the combustor, and control means responsive to engine operating conditions for adjusting the fuel flow into the combustor and for throttling the amount of air entering the compressor.

2. The engine as set forth in claim 1 in which said control means measures the exit temperature of said combustor and throttles the amount of air entering the compressor to prevent said combustor exit temperature from falling below a prespecified value.

3. The engine as set forth in claim 2 wherein the prespecified value of the combustor exit temperature is such that sufficient heat remains in the exhaust from said Brayton turbine to drive said compressor by means of said Rankine turbine at least at 50% of maximum speed.

4. The engine as set forth in claim 1 wherein said control means measures the inlet air flow into said compressor and the fuel flow of said combustor and throttles the amount of air entering the compressor to prevent the fuel/air ratio from decreasing below a prespecified value.

5. The engine as set forth in claim 4 wherein the prespecified value of the fuel/air ratio is such that sufficient heat remains in the exhaust from said Brayton turbine to drive said compressor by means of said Rankine turbine at least 50% of maximum speed.

6. The engine as set forth in claim 1 wherein said control means measures the rotor speed of said compressor and throttles the air entering the compressor to prevent said compressor rotor speed from decreasing below a prespecified value.

7. The engine as set forth in claim 1 wherein said control means measures the exit temperature of said combustor and adjusts the fuel metering system and the inlet air throttling system to maintain the exit temperature of the combustor within a prespecified temperature range.

8. The engine as set forth in claim 7 wherein said prespecified temperature range is 1300° F. to 1900° F.

9. An engine comprising in combination a single-stage main power turbine having an inlet and an exhaust, a single-stage compressor having an inlet and outlet, a combustion chamber situated between said compressor and said main power turbine, said compressor and combustion chamber supplying the main power turbine with air and products of combustion to power the same, sensor means in said power turbine inlet for measuring the temperature thereof, valve means positioned in said compressor inlet for adjusting the amount of air supplied to the compressor, control means for controlling the amount of fuel supplied to the combustion chamber and for adjusting said valve means in order to maintain the temperature of said power turbine within a prespecified temperature range, said control means adapted to take into account the input from said sensor means, means including a single-stage Rankine fluid turbine for driving said compressor independently of said power turbine, said Rankine turbine having an inlet and an exhaust, a closed-circuit Rankine cycle system for powering said Rankine turbine, a heat exchanger in said Rankine system positioned to absorb heat from the exhaust of said power turbine and connected to the inlet of the Rankine turbine to deliver thereto fluid vaporized in the heat exchanger, and condensing means connected to the outlet of the Rankine turbine and to the inlet of the heat exchanger for returning the condensed vaporized fluid to the heat exchanger.

10. The engine as set forth in claim 9 further comprising a pump for circulating said Rankine fluid through said closed-circuit Rankine system.

11. The engine as set forth in claim 10 wherein said pump comprises a centrifugal fluid type and is mounted coaxial with the Rankine turbine and rotates therewith.

12. The engine as set forth in claim 9 wherein said compressor, power turbine and Rankine turbine are mounted along the same axis on an interconnecting shaft, and an overrunning clutch is positioned on said shaft between said power turbine and said compressor.

13. A control mechanism for an integrated Brayton cycle-Rankine cycle engine, the engine having a Rankine turbine and a rotary compressor driven thereby, a Brayton turbine and an intercycle heat exchanger heated by the exhaust of the Brayton turbine and delivering heat to the Rankine turbine, a burner and air supply assembly for delivering air from the compressor and the products of combustion to the Brayton turbine, said control mechanism comprising means for measuring the Brayton turbine inlet temperature, means for adjusting the flow of air into the compressor and means for adjusting the amount of fuel into the burner, said control mechanism being responsive to said Brayton turbine inlet temperature to throttle the air flow into the compressor and vary the fuel flow into the burner in order to maintain the Brayton turbine inlet temperature within a prespecified range.

14. The control mechanism set forth in claim 13, wherein the upper limit of the prespecified range is predetermined by the metallurgical considerations of said engine and the lower limit is predetermined by expected engine operating conditions to allow the maintenance of sufficient heat in the Brayton turbine exhaust to drive the compressor continuously at least at 50% speed.

15. The control mechanism set forth in claim 14, wherein said prespecified range is 1300° F. to 1900° F.

16. A method for controlling the power level of an integrated Brayton cycle-Rankine cycle engine, the engine having a Rankine turbine and a rotary compressor driven thereby, a Brayton turbine having an inlet and an outlet, an intercycle heat exchanger heated by the exhaust of the Brayton turbine and delivering heat to the Rankine fluid for powering the Rankine turbine, a burner and air supply assembly for delivering air from the compressor and the products of combustion to the Brayton turbine, said method comprising the steps of continuously measuring the temperature at the inlet to the Brayton turbine, and reducing the air flow to the compressor and the fuel flow to the burner in accordance with the temperature at said inlet in order to maintain the Brayton turbine inlet temperature within prespecified limits, whereby at idle and low power levels combustion stability is maintained, fuel flow is minimized, and sufficient heat remains in the Brayton turbine exhaust to drive the compressor continuously at least at 50% speed.

17. The method as set forth in claim 16 wherein the air flow to the compressor is initially reduced when the power level of the engine falls below 25% of full power.

18. The method as set forth in claim 16 wherein the air flow to the compressor and the fuel flow to the burner are reduced simultaneously when said inlet temperature reaches a prespecified minimum value so that the fuel/air ratio is maintained relatively constant thereafter.

* * * * *